HEAVY DUTY CONTAINER

Original Filed Jan. 12, 1972 3 Sheets-Sheet 1

United States Patent

Re. 28,439

Reissued June 3, 1975

28,439

HEAVY DUTY CONTAINER

Charles J. Shepherd, Pasadena, Tex., assignor to Container Corporation of America, Chicago, Ill.

Original No. 3,726,467, dated Apr. 10, 1973, Ser. No. 217,090, Jan. 12, 1972. Application for reissue Aug. 23, 1974, Ser. No. 499,831

Int. Cl. B865d *5/00, 13/00*

U.S. Cl. 229—23 R 9 Claims

Matter enclosed in heavy brackets [ ] appears in the original patent but forms no part of this reissue specification; matter printed in italics indicates the additions made by reissue.

ABSTRACT OF THE DISCLOSURE

A heavy duty paperboard shipping container has a body formed from a pair of telescoping tubular elements wherein all but one of the walls of the container body are double-ply in thickness throughout their entire width, and wherein one wall is double-ply in thickness throughout the majority of its width and is triple-ply for a minority of its width adjacent one corner of the container body.

It is a primary object of this invention to provide, in a heavy duty container of the type described, an improved corner arrangement which is relatively easy to construct and assemble and also which is extremely rigid and durable.

A more specific object of the invention is to provide, in a shipping container of the type described, a wall construction wherein all but one of the walls are double-ply and one wall comprises: one uninterrupted ply, one ply formed of two panels meeeting in a butt joint, and a securing flap extending from one corner of the container beyond said butt joint.

These and other objects of the invention will be apparent from an examination of the following description and drawings.

DRAWINGS

FIGS. 5, 6, 7, and 8 correspond generally to FIGS. 1, 2, 3, and 4, respectively, but illustrate yet another embodiment of the invention;

It will be understood that, for purposes of clarity, certain elements have been intentionally omitted from certain views where they are believed to be illustrated to better advantage in other views.

Figure 1:
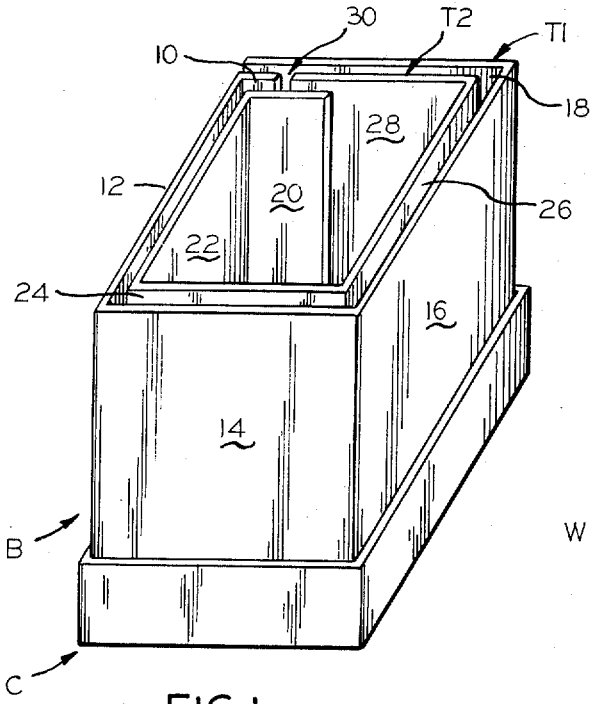
FIG. 1 is an exploded perspective view of a heavy duty shipping container embodying features of the invention with the closure means being shown on only one end of the container body.
Figure 2:
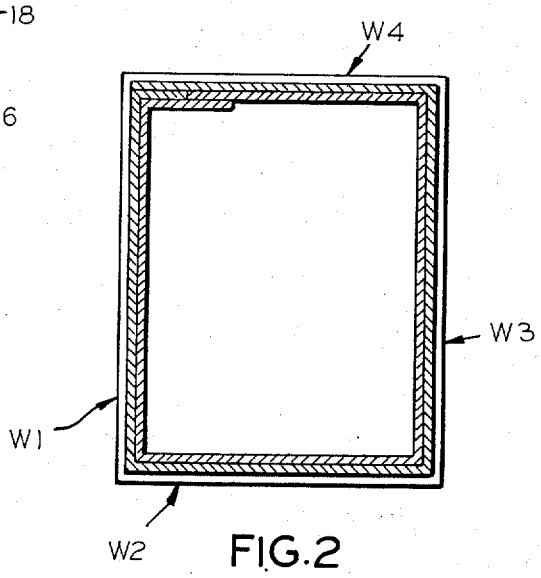
FIG. 2 is a horizontal section of the structure illustrated in FIG. 1.

Referring now to the drawings for a better understanding of the invention and particularly to FIGS. 1 and 2, it will be seen that the heavy duty shipping container embodying features of the invention includes a body, generally designated B, and a cap, generally designated C, adapted to close one end of the body. A similar cap may be provided for the closure of the other end of the container body. Other closure means such as overlying flaps not shown, but well known in the art, may be employed for providing a closure for either end of the body.

The details of cap C are not shown as the cap may be of conventional tray type construction well known in the art.

Still referring to FIGS. 1 and 2, it will be seen that the body B of the container is formed from a pair of tubular elements or tubes T1 and T2 which are laminated to each other and positioned in telescoping relationship to form a vertical sleeve or tubular body wherein three of the walls are double-ply in thickness thorughout their entire width, and the fourth wall is double-ply throughout the majority of its width and is triple-ply throughout a minority of its width adjacent one corner of the body.

Figure 3:
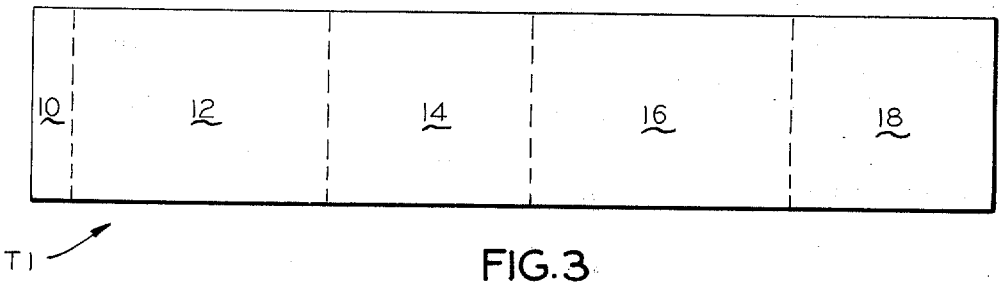
FIGS. 3 and 4 are plan views of the tubular members in flat condition from which the body of the container illustrated in FIG. 1 is formed.
Figure 4:
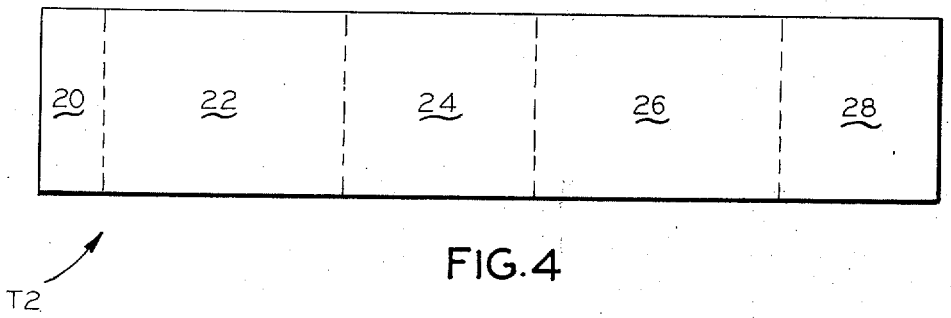

Tubes T1 and T2 may be formed from cut and scored rectangular blanks of paperboard, preferably corrugated paperboard, illustrated in FIGS. 3 and 4, respectively, of the drawings.

Referring now to FIG. 3, wherein tube T1 is illustrated in a flat condition, it will be seen that the tube is divided, by a plurality of parallel score lines, into a plurality of panels which reading from left to right, are indicated by the numerals 10, 12, 14, 16, and 18. When the blank is folded into a tubular configuration it will be seen that the dimensions of center panels 12, 14, and 16 correspond generally to the dimensions of the three walls W1, W2, and W3 of the container body, which are double-ply in thickness throughout their entire width. At opposite ends of the blank are a relatively narrow end panel 10, on the left, and relatively wide end panels 18, on the right.

Turning now to FIG. 4 of the drawings, it will be seen that tube T2 is likewise divided, by a plurality of parallel score lines, into three center panels 22, 24, and 26, which have dimensions corresponding to the dimensions of walls W1, W2, and W3 of the container body, a relatively narrow end panel 20, at the left, and a relatively wide end apenl 28, at the right.

In forming the body, the container tubes T1 and T2 are adhesively secured to each other and then folded on their score lines into tubular structures and telescoped together to provide a sleeve-like body as illustrated in FIG. 1 with the tube T1 on the outside and the tube T2 on the inside. It will be seen that the three walls W1, W2, and W3 are double-ply in thickness throughout their entire width, whereas the fourth wall W4 is two-ply in thickness throughout the majority of its width and three-ply thickness for a minority of its width adjacent one corner.

The fourth wall W4 includes: an outer ply formed entirely of wide end panel 18 of tube T1; an inner ply formed from narrow end panel 10 of tube T1 and wide end panel 28 of tube T2 which are disposed in abutting, co-planar relationship and form a butt-joint 30 located closely adjacent one corner of the container; and an inner securing flap formed from narrow end panel 20 of tube T2 which extends from the corner of the container beyond butt-joint 30 and is secured to panels 10 and 28 in face-to-face relationship so as to cover the butt-joint 30.

Referring now to FIGS. 5 through 8 for illustration of another embodiment of this invention, it is to be noted that elements shown in FIGS. 5 through 8 which correspond to the elements heretofore described in connection with description of FIGS. 1 through 4 have the reference numerals of elements in FIGS. 1 through 4 except that that numerals are increased by 100.

Figure 5:
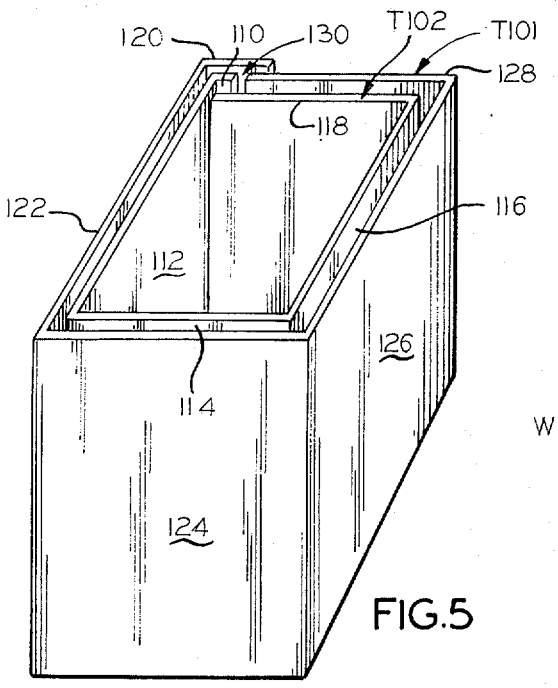
Figure 6:
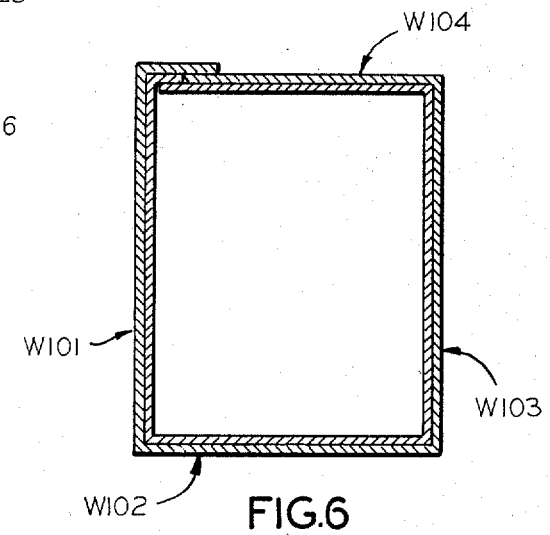
Figure 8:
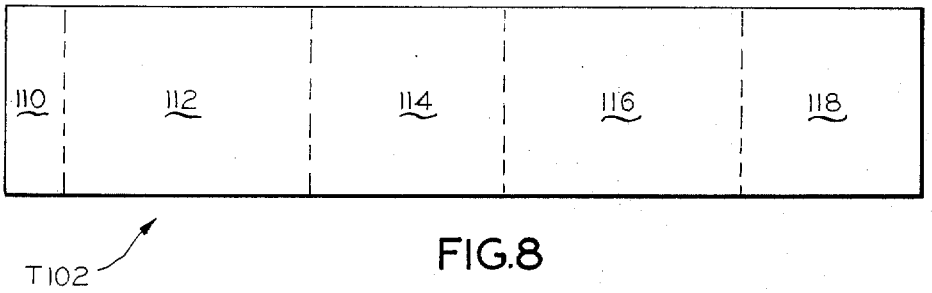
Figure 7:
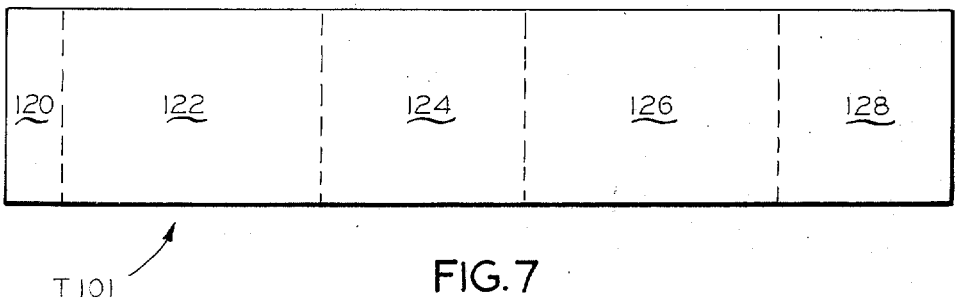

The bottom of container shown in FIG. 5 may be closed by closure flaps, not shown, but well known in the art.

The body of the container of FIG. 5 is formed from the tubes T101 and T102. This embodiment is generally similar to the embodiment heretofore described having walls W101, W102, and W103 of the same type construction as walls W1, W2, and W3.

The fourth wall W104 includes: an inner ply formed entirely of wide end panel 118 of tube T102; an outer ply formed from narrow end panel 110 of tube T102 and wide end panel 128 of tube T101 which are disposed in abutting, co-planar relationship forming a butt-joint 130 located closely adjacent one corner of the container;

and an outer securing flap formed from narrow end panel 120 of tube T101 extending from the corner of the container beyond the butt-joint 130 and being secured to panels 110 and 128 in face-to-face relationship covering the butt-joint 130. The inner and outer plies are secured to each other in face-to-face relationship.

A still another embodiment of the invention is shown in FIGS. 9 through 12 where elements corresponding to the elements shown in FIGS. 1 through 4 have reference numeral of the elements in FIGS. 1 through 4 except that such numerals are increased by 200.

Figure 9:
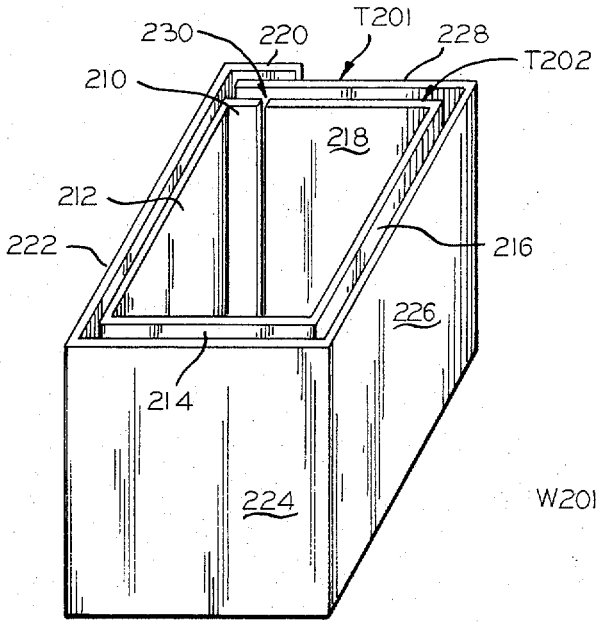
Figure 10:
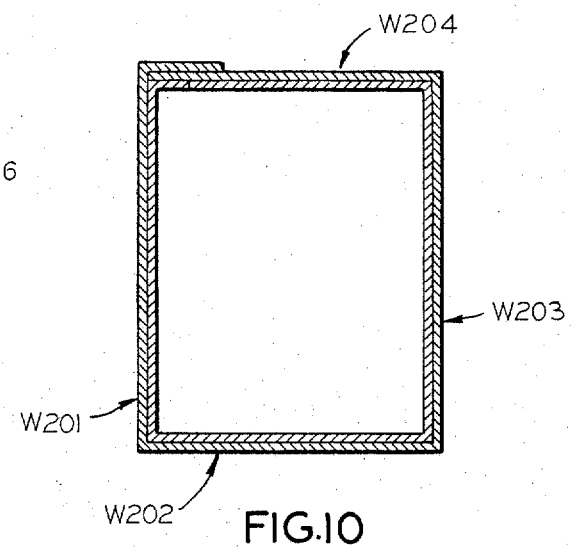
Figure 12:
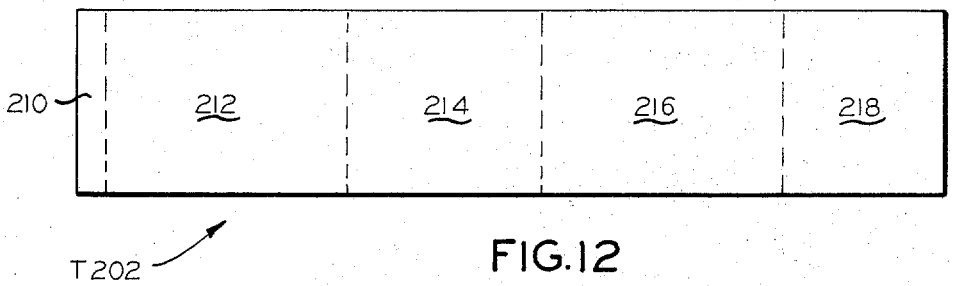
Figure 11:
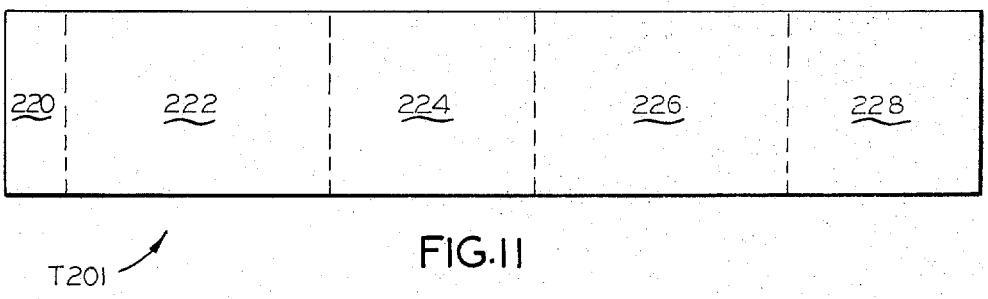

The body of the container of FIG. 9 is formed from tubes T201 and T202 as heretofore generally described in reference to preceding embodiments. In this embodiment, the walls W201, W202, and W203 are of the same type construction as walls W1, W2, and W3. Here, however, the fourth container wall W104 includes: an inner ply formed from a narrow end panel 210 and wide end panel 218 both panels being portions of the tube T202 and being disposed in abutting, co-planar relationship forming a butt-joint 230 closely adjacent a corner of the container; an outer ply formed entirely of wide end panel 228 of tube T201; and an outer securing flap formed from narrow end panel 220 of tube T201 and extending from the corner of the container beyond the butt-joint 230 and being secured to panel 228 in face-to-face relationship. The inner and outer plies of the wall W204 are secured to each other in face-to-face relationship, as was the case with other embodiments.

I claim:

1. An improved corner construction for a heavy duty shipping container having a tubular body and end closure means for closing the ends of said body wherein said body comprises:

a. a pair of first and second tubes, formed from paperboard and adhesively secured to each other in telescoping relation, each of said tubes including five panels hingedly attached along parallel fold lines, wherein:
   i. each of the three center panels has a width corresponding substantially to the width of one of three walls of said body;
   ii. the two end panels have a combined width substantially equal to at least the width of the fourth wall of said body with one of said end panels being relatively wide and the other panel being relatively narrow;

b. said tubes being disposed one within the other, with the three center panels of each tube positioned in face-to-face relation to provide double-ply thickness for said three walls of said body;

c. said fourth wall of said body being double-ply in thickness throughout the majority of its width and having a joint section at one side thereof, adjacent one corner of said body which is triple-ply in thickness;

d. said fourth wall having:
   i. one ply formed entirely from one of the wide end panels;

ii. another ply formed from the other of the wide end panels and one of the narrow end panels having adjacent end edges forming a butt-joint;
   iii. a securing flap formed from the other narrow panel and extending from said corner beyond said butt-joint;

*e. said securing flap being located outwardly of said one ply and said other ply.*

2. A corner construction according to claim 1, wherein the ply having said buttt-joint is formed from end panels of the same tube.

3. A corner construction according to claim 1, wherein the ply having said buttt-joint is formed from end panels of different tubes.

[4. A corner construction according to claim 1, wherein said one ply is located outwardly of said other ply and said securing flap.]

5. A corner construction according to claim 1, wherein said one ply is located between said other ply and said securing flap.

6. A corner construction according to claim 1, wherein said one ply is located inwardly of said other ply and said securing flap.

7. A corner construction according to claim 1, wherein said other ply is located between said one ply and said securing flap.

8. A corner construction according to claim 1, wherein said other ply is located inwardly of said one ply and said securing flap.

9. A corner construction according to claim 1, wherein said closure means includes closure flaps hingedly attached to the ends of said container body walls and secured to each other in overlapped relation.

10. A corner construction according to claim 1, wherein said closure means includes at least one cap adapted to telescopically receive an end portion of said container body.

References Cited

The following references, cited by the Examiner, are of record in the patented file of this patent or the original patent.

UNITED STATES PATENTS

| | | | |
|---|---|---|---|
| 206,719 | 8/1878 | Gibson | 229—23 A |
| 1,121,947 | 12/1914 | Surmann | 229—23 R |
| 2,019,995 | 11/1935 | Rippen | 229—23 B X |
| 2,491,206 | 12/1949 | Potts | 229—23 R |
| 3,118,587 | 1/1964 | Welshenbach | 229—23 BT |
| 3,157,345 | 11/1964 | George | 229—23 BT |
| 3,361,326 | 1/1968 | Croley et al. | 229—37 R |
| 3,643,856 | 2/1972 | Jones | 229—37 R |
| 3,744,702 | 7/1973 | Eillison | 229—23 R |

DAVIS T. MOORHEAD, Primary Examiner

U.S. Cl. X.R.

229—37 R